US 6,670,560 B2

(12) United States Patent
Curtis

(10) Patent No.: US 6,670,560 B2
(45) Date of Patent: Dec. 30, 2003

(54) SENSOR INTEGRATED BRACKET FOR WEIGHT CLASSIFICATION

(75) Inventor: Brian M. Curtis, Lake Orion, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 263 days.

(21) Appl. No.: 09/962,567

(22) Filed: Sep. 25, 2001

(65) Prior Publication Data
US 2002/0066603 A1 Jun. 6, 2002

Related U.S. Application Data
(60) Provisional application No. 60/237,256, filed on Oct. 2, 2000.

(51) Int. Cl.[7] .......................... B60T 7/14; G01G 19/52; G01G 3/14
(52) U.S. Cl. .................. 177/144; 177/211; 177/229; 73/862.634; 73/862.639; 180/273; 280/735
(58) Field of Search ................... 73/862.632, 862.633, 73/862.634, 862.637, 862.638, 862.639; 177/211, 229, 136, 144, 210 R; 280/735; 180/273; 701/45

(56) References Cited

U.S. PATENT DOCUMENTS

| 4,181,012 A | | 1/1980 | Kiuchi | 73/862.634 |
|---|---|---|---|---|
| 4,249,623 A | * | 2/1981 | McCauley | 177/136 |
| 4,558,757 A | | 12/1985 | Mori et al. | 177/211 |
| 4,600,066 A | * | 7/1986 | Griffen et al. | 177/211 |
| 4,650,016 A | * | 3/1987 | Sijeokov Andriewsky | 177/211 |
| 4,666,003 A | * | 5/1987 | Reichow | 177/136 |
| 4,691,794 A | * | 9/1987 | Larsen et al. | 177/211 |
| 4,775,018 A | * | 10/1988 | Kroll et al. | 177/211 |
| 4,848,493 A | * | 7/1989 | Hitchcock | 177/211 |
| 4,880,069 A | * | 11/1989 | Bradley | 177/211 |
| 5,294,756 A | * | 3/1994 | Lauber et al. | 177/211 |
| 5,413,378 A | | 5/1995 | Steeffens, Jr. et al. | 280/735 |
| 5,481,078 A | | 1/1996 | Asche | 200/85 A |
| 5,626,359 A | | 5/1997 | Steffens, Jr. et al. | 280/735 |
| 5,670,853 A | | 9/1997 | Bauer | 180/273 |
| 5,739,757 A | | 4/1998 | Gioutsos | 340/667 |

(List continued on next page.)

FOREIGN PATENT DOCUMENTS

| DE | 38 09 074 C2 | 3/1992 |
|---|---|---|
| DE | 197 52 356 A1 | 5/1999 |
| DE | 199 31 379 A1 | 1/2001 |
| EP | 0 962 362 A2 | 12/1999 |
| EP | 0 990 565 A1 | 4/2000 |
| GB | 2170931 A | 8/1986 |
| GB | 2293895 A | 4/1996 |
| JP | 9-150662 | 6/1997 |
| WO | WO 01/00454 A1 | 1/2001 |

OTHER PUBLICATIONS

Research Disclosure, Jul., 1997, XP–000726567.

Research Disclosure, Jul., 1997, 339.

Primary Examiner—Randy Gibson

(57) ABSTRACT

A sensor assembly is used to measure the weight of an occupant seated on a vehicle seat. The sensor assembly is integrated into a bracket that is mounted between a seat structure such as a track assembly and a vehicle structure such as floor or riser. One bracket is mounted on an inboard side of the seat and a second bracket is mounted on an outboard side of the seat. Each bracket includes opposing end mounts that are mounted to the vehicle structure. Between the opposing ends, each bracket includes a pair of deflectable portions that define a mount interface for attachment to the seat structure. A central body extends between the deflectable portions to form unitary bracket member that includes the end mounts, the deflectable portions and the central body. A strain gage is mounted on each deflectable portion to measure the weight of the seat occupant.

20 Claims, 7 Drawing Sheets

U.S. PATENT DOCUMENTS

| | | | |
|---|---|---|---|
| 5,810,392 A | 9/1998 | Gagnon | 280/735 |
| 5,942,695 A | 8/1999 | Verma et al. | 73/768 |
| 5,971,432 A | 10/1999 | Gagnon et al. | 280/735 |
| 6,005,199 A | 12/1999 | Harada et al. | 177/211 |
| 6,039,344 A | 3/2000 | Mehney et al. | 280/735 |
| 6,069,325 A | 5/2000 | Aoki | 177/136 |
| 6,070,115 A | 5/2000 | Oestreicher et al. | 701/45 |
| 6,092,838 A | 7/2000 | Walker | 280/735 |
| 6,161,891 A | 12/2000 | Blakesley | 296/65.01 |

* cited by examiner

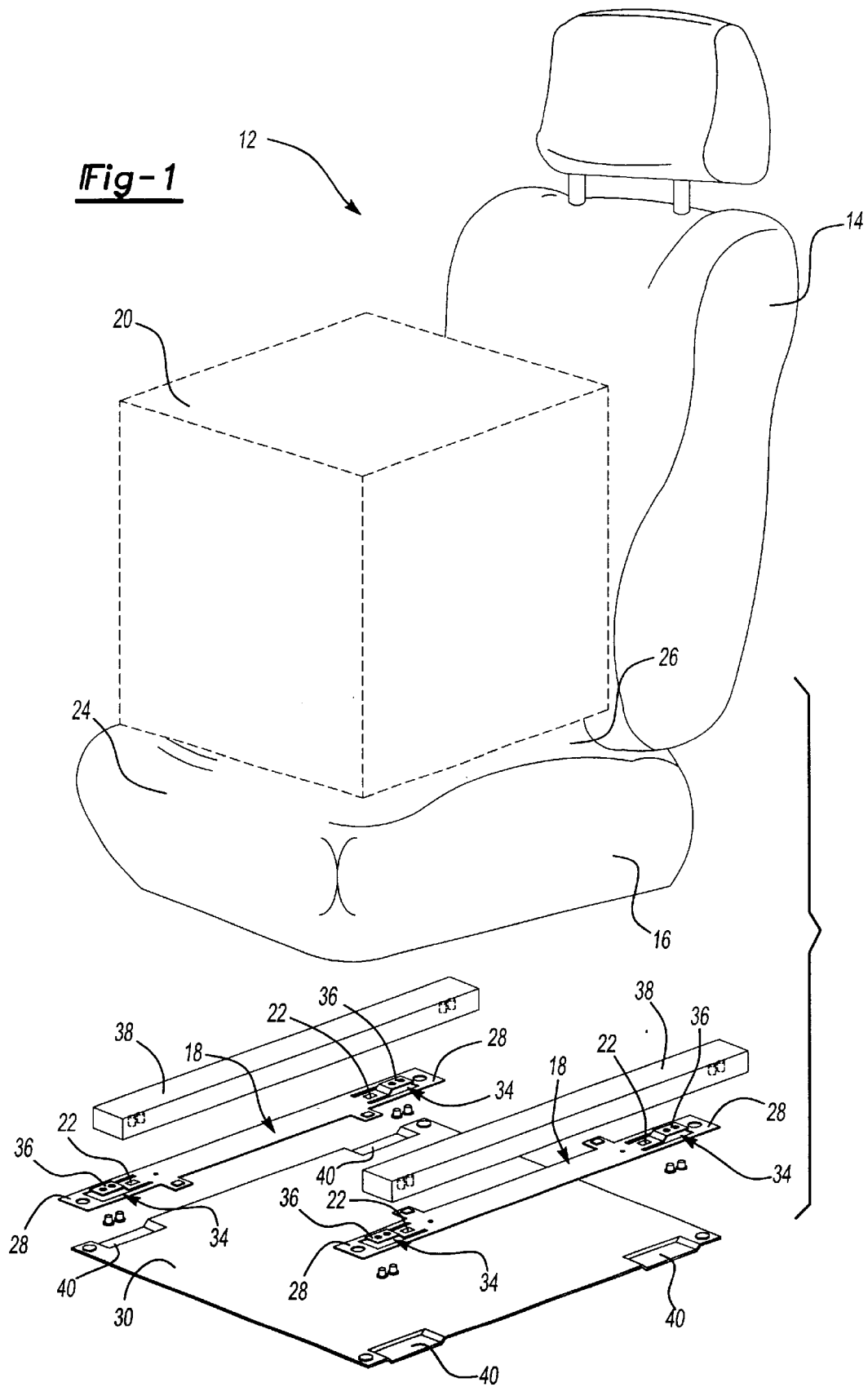

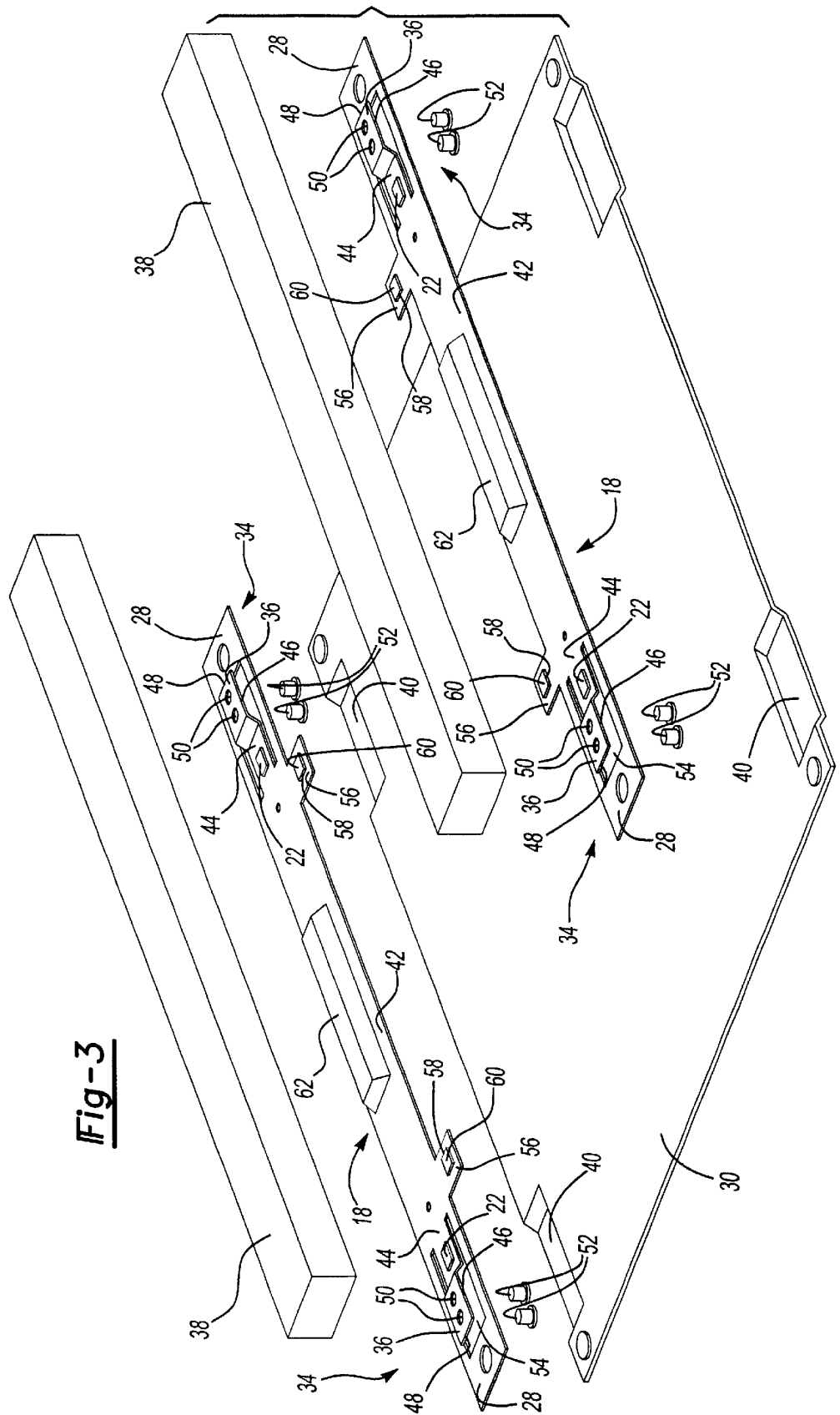

SENSOR INTEGRATED BRACKET FOR WEIGHT CLASSIFICATION

RELATED APPLICATION

This application claims priority to provisional application No. 60/237,256 filed on Oct. 2, 2000.

BACKGROUND OF THE INVENTION

1. Field of the Invention

This invention relates to a sensor assembly for measuring a weight force applied to a vehicle seat. Specifically, a sensor arrangement is integrated into a bracket that is mounted between a seat structure and a vehicle structure.

2. Related Art

Most vehicles include airbags and seatbelt restraint systems that work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If there is an infant seat or a small adult/child secured to the vehicle seat then the airbag should not be deployed or should be deployed at a significantly lower deployment force. One way to control the airbag deployment is to monitor the weight of the seat occupant.

Current systems for measuring the weight of a seat occupant are complex and expensive. One type of system uses pressure sensitive foil mats mounted within the seat bottom foam. Another system uses sensors placed at a plurality of locations within the seat bottom. The combined output from the mats or the sensors is used to determine the weight of the seat occupant. If the sensors become damaged or fail to operate for some reason, the system will not provide accurate seat weight measurements and airbag deployment could occur under undesirable conditions.

Also, mounting these types of sensor systems within the seat can be difficult and time consuming. It is difficult to find mounting locations for each the sensors that will accommodate all of the various positions of a seated occupant while still providing accurate measurements. Further, shifting of the occupant on the seat can dislodge or move the sensors out of their proper location. Because the sensors are mounted within the seat bottom, it is difficult to reposition the sensors after the seat is installed in the vehicle.

In order to address issues such as these, another type of sensor system was developed, which did not require sensors to be place within the seat bottom. This other system individually mounted strain gages at each c of the seat. But, the installation of this type of sensor system can also be difficult and time consuming. Each strain gage sensor assembly is mounted to a separate mount. Then each mount must be individually installed at the seat corners.

Thus, it is desirable to have a simplified sensor assembly for measuring seat occupant weight, which decreases assembly time and cost. The system should further provide accurate measurements and be easy to service and maintain as well as overcoming the above referenced deficiencies with prior art systems.

SUMMARY OF THE INVENTION

A sensor assembly for measuring seat occupant weight is integrated into a mounting bracket that is installed on the inboard and outboard sides of a vehicle seat between a seat structure and a vehicle structure. Each mounting bracket includes at least one deflectable portion that supports a sensor assembly. A mount interface on the deflectable portion secures the bracket to the seat structure while mounting portions are located at opposing ends of the bracket to secure the bracket to the vehicle structure. The seat structure can be a seat track or seat pan and the vehicle structure can be vehicle floor or riser assembly that vertically positions the seat to a desired height.

In a disclosed embodiment of this invention, each bracket includes a pair of deflectable portions with one deflectable portion near the front of the seat and one deflectable portion near the rear of the seat. A central body portion extends between the pair of deflectable portions. The deflectable portions are movable relative to the central body portion due to input from the seat structure. The mounting portions, deflectable portions, and central body portion are all formed together as a unitary member.

Preferably the sensor assembly includes at least one strain gage mounted at each deflectable portion. Thus, in the preferred embodiment, a pair of strain gages would be located on the inboard side of the seat and a pair of strain gages would be located on the outboard side of the seat. The strain gage is mounted on the deflectable portion between the mount interface and the central body portion and measures the strain on the deflectable portion resulting from weight forces exerted on the seat.

Data from the sensor assembly is sent to an electronic control unit to identify and classify the seat occupant. The control unit can then control deployment of safety devices, such as an airbag, based on the weight forces as measured by the sensor assembly.

Integrating the sensors into the bracket simplifies assembly time as only one bracket with multiple sensors is installed on each side of the seat. These and other features of the present invention can be best understood from the following specification and drawings, the following of which is a brief description.

BRIEF DESCRIPTION OF THE DRAWINGS

FIG. 1 is an exploded view of a seat assembly incorporating the subject invention.

FIG. 3 is a perspective view of the bracket of FIG. 1.

DETAILED DESCRIPTION OF AN EXEMPLARY EMBODIMENT

Figure 2A:
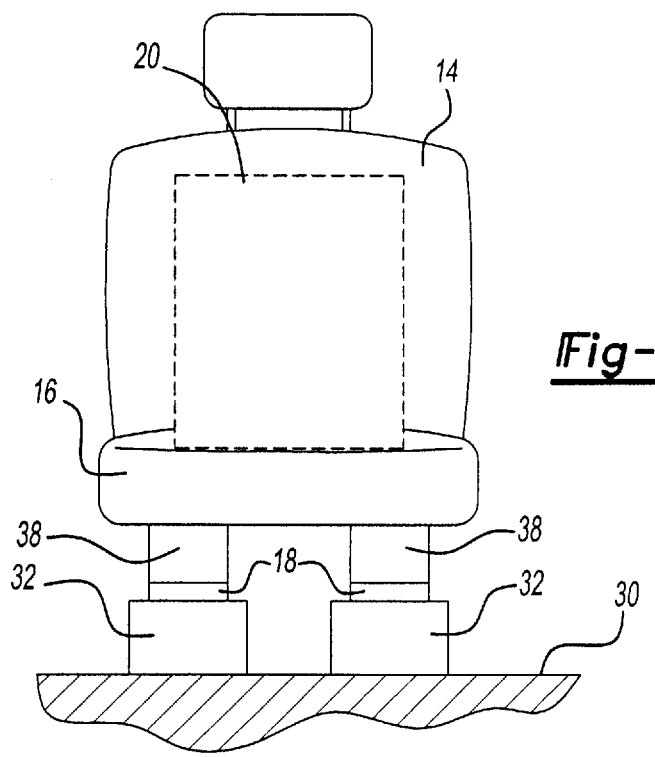
FIG. 2A is a schematic view of an alternate mounting configuration.

A vehicle includes a vehicle seat assembly, shown generally at 12 in FIG. 1. The seat assembly 12 includes a seat back 14 and a seat bottom 16. A sensor integrated bracket assembly, shown generally at 18, is installed on an inboard side of the seat assembly 12 and on an outboard side of the seat assembly 12 to measure the weight of a seat occupant 20. While the seat occupant 20 is shown schematically in FIG. 1, it should be understood that the occupant 20 could be an adult, child, or infant seat.

Each sensor integrated bracket 18 supports at least one weight sensor 22 and preferably each bracket 18 supports a pair of sensors 22. One sensor 22 is preferably located near a front section 24 of the seat assembly 12 and one sensor 22 is preferably located near a rear section 26 of the seat assembly 12.

The brackets 18 are mounted between a seat structure and a vehicle structure. The brackets 18 further include mounting portions 28 on opposing ends for attachment to the vehicle structure. The vehicle structure can be any type of known vehicle structure such as a vehicle floor 30, shown in FIGS. 1 and 2B, or a riser apparatus 32, shown in FIG. 2A. The riser apparatus 32 is well known in the art and vertically positions the seat assembly 12 to a desired height with respect to the floor 30. The brackets 18 include deflectable portions 34 each of which includes a mount interface 36 for attachment to the seat structure. The seat structure can be any type of known seat structure such as a track assembly 38 for longitudinal seat position adjustment, shown in FIGS. 1 and 2A, or the riser apparatus 32 shown in FIG. 2B.

Figure 2B:
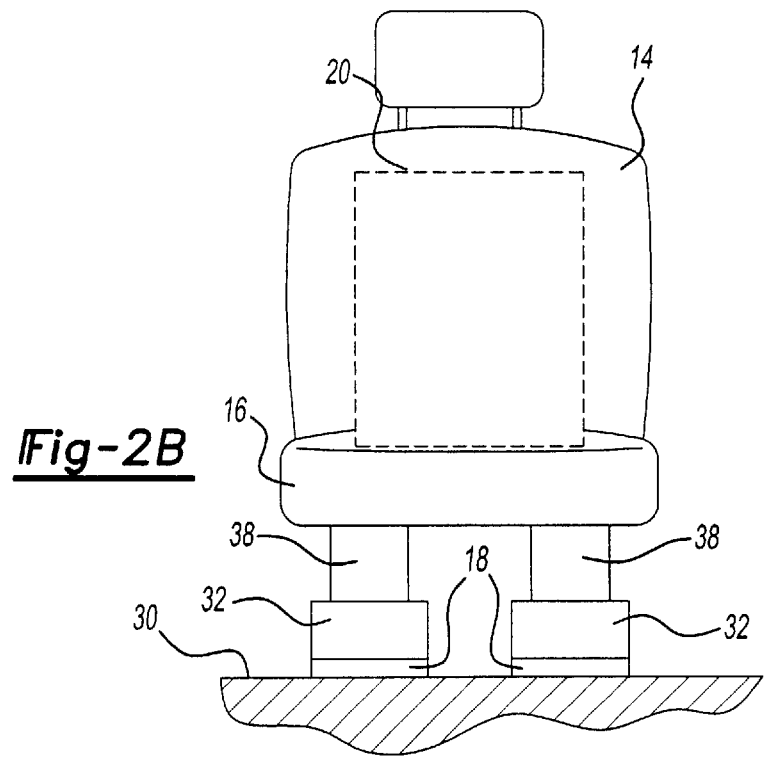
FIG. 2B is a schematic view of an alternate mounting configuration.

For the mounting configurations shown in FIGS. 1 and 2B, recesses 40 (see FIG. 1) can be formed within the floor 30 to provide an uninhibited range of motion for the deflectable portions 34. Similarly, the riser apparatus 32 in the mounting configuration shown in FIG. 2A can also include recesses for the deflectable portions 32.

The sensor integrated bracket embodiment of FIG. 1 is shown in greater detail in FIG. 3. Each bracket 18 includes a central body portion 42 that extends between the deflectable portions 34. The deflectable portions 34 are located near the ends of the bracket 18 with each deflectable portion 34 being positioned between the central body portion 42 and one of the mounting portions 28. The mounting portions 28, the deflectable portions 34, and the central body portion 42 are all formed as a unitary member, i.e., are integrated together and formed as one piece.

In the bracket embodiment shown in FIG. 3, the deflectable portion 34 includes a first portion 44 that supports the sensor 22 and a second portion 46 that defines the mount interface 36. The sensor 22 can be mounted on either the top or bottom surface of the first portion 44. The deflectable portion 34 is movable relative to the central body portion 42 in response to a weight force applied to the seat assembly 12. The deflectable portions 34 are only attached to the bracket 18 at one end. The first portion 44 is formed with the central body portion 42 and the second portion 46 includes a distal end 48 that is not formed with the mounting portion 28. Thus, in the unassembled configuration shown in FIG. 3, the deflectable portions 34 are of a cantilevered formation.

The central body portion 42 defines a first plane and the second portion 46 defines a plane that is vertically higher than the first plane. In this embodiment, the central body portion 42, the mounting portions 28, and the first portions 44 of the deflectable portions 34 are all located within the first plane. The mount interface 36 for attachment to the seat structure is in the raised plane. The mount interface 36 can include openings 50 for receiving fasteners 52 to attach the bracket 18 to the seat structure as shown, however, other known attachment methods can also be used.

Openings 54 are formed within the bracket 18 to allow the deflectable portions 34 to deflect or move relative to the central body portion 42. The openings 54 are wide enough so that the sides of the deflectable portions 34 do not scrape or rub against the bracket 18. When a weight force is applied to the seat assembly 12, this force is transferred to the deflectable portions 34 via the mount interface 36 causing the deflectable portions 34 to exhibit strain, which is measured by the sensors 22. This mounting configuration, with the sensor 22 placed on the first portion 44 and the raised mount interface 36, provides S-shaped bending to achieve increased sensor accuracy. This will be discussed in greater detail below.

An inwardly extending tab member 56 is formed on the bracket 18 near each deflectable portion 34. The tab member 56 includes a strain relief feature for the bracket 18. A recess 58 can be optionally formed within the tab member 56 to receive an application specific integrated circuit (ASIC) 60. The use of ASICs 60 in seat weight sensing applications is well known and thus will not be discussed in detail. Another optional feature is the formation of at least one strengthening rib 62 in the central body portion 42 to provide increased stability for the bracket 18. While a single rib 62 is shown, it should be understood that multiple ribs could be formed within the bracket 18.

Figure 4:
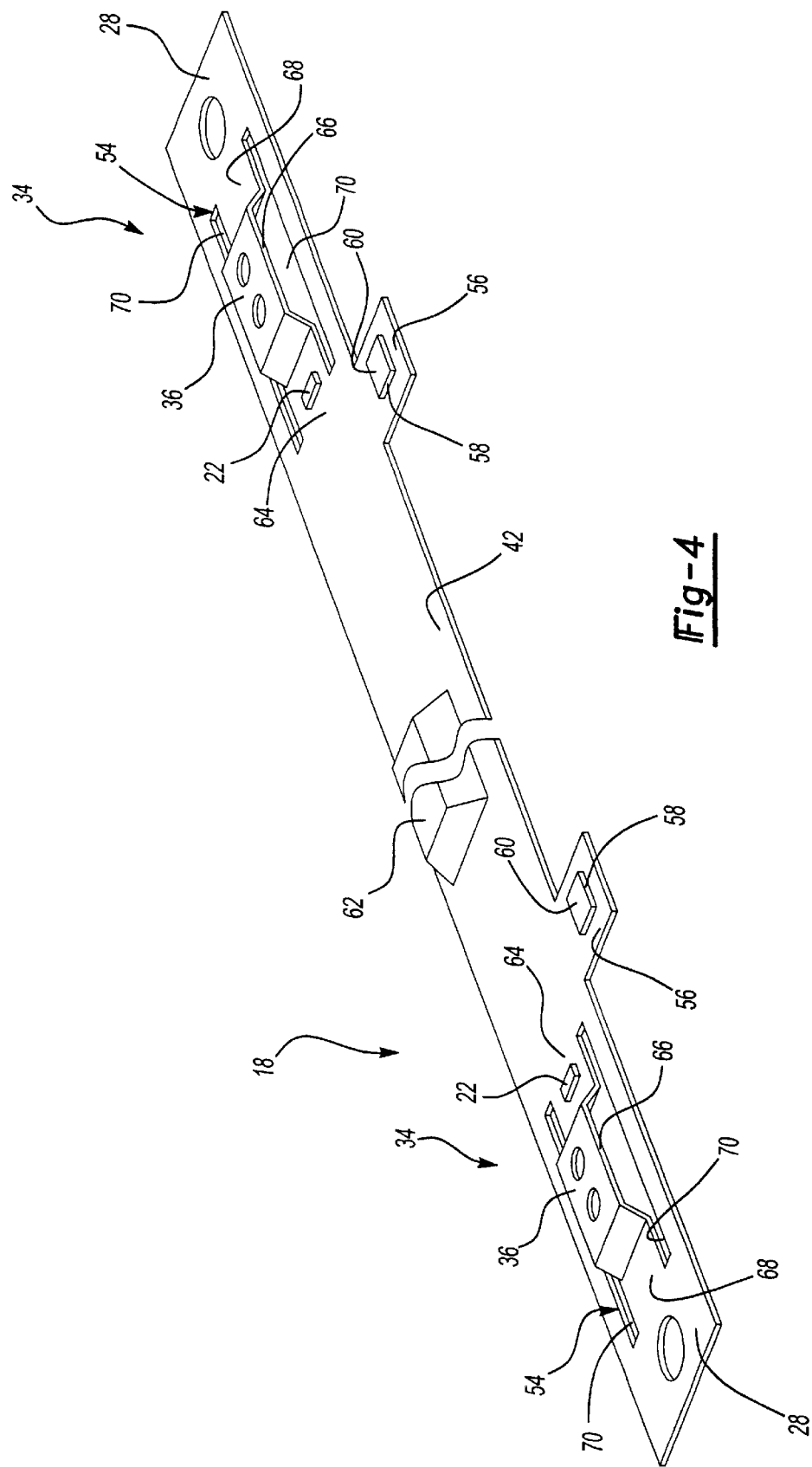
FIG. 4 is a perspective view of an alternate embodiment bracket assembly.

FIG. 4 shows an alternate embodiment for the deflectable portions 34. The bracket 18 includes the central body portion 42 and the mounting portions 28 at opposing ends as discussed above. The bracket 18 also optionally includes the strengthening rib 62 and tab member 56 with the ASIC 60. The deflectable portions 34 are received within the openings 54 in the bracket 18 between the central body portion 42 and the mounting portions 28.

The deflectable portion 34 in this embodiment each include a first section 64, a second section 66 that includes the mount interface 36, and a third section 68. The first section 64 is between the central body portion 42 and the second section 66 and the third section 68 is between the mounting portion 28 and the second section 66. The first 64 and third 68 sections are coplanar with the central body portion 42. The second section 66 defines a plane that is vertically higher than the central body portion 42. The deflectable portion 34 is attached to the bracket 18 at opposing ends, i.e. the first 64, second 66, and third 68 sections extend as one piece from the central body portion 42 to the mounting portion 28. The openings 54 in this embodiment are further defined as a pair of slots 70 on either side of the deflectable portion that provide and uninhibited range of movement for the deflectable portions 34. The sensors 22 are preferably mounted on the first section 64 of the deflectable portion 34.

Figure 5:
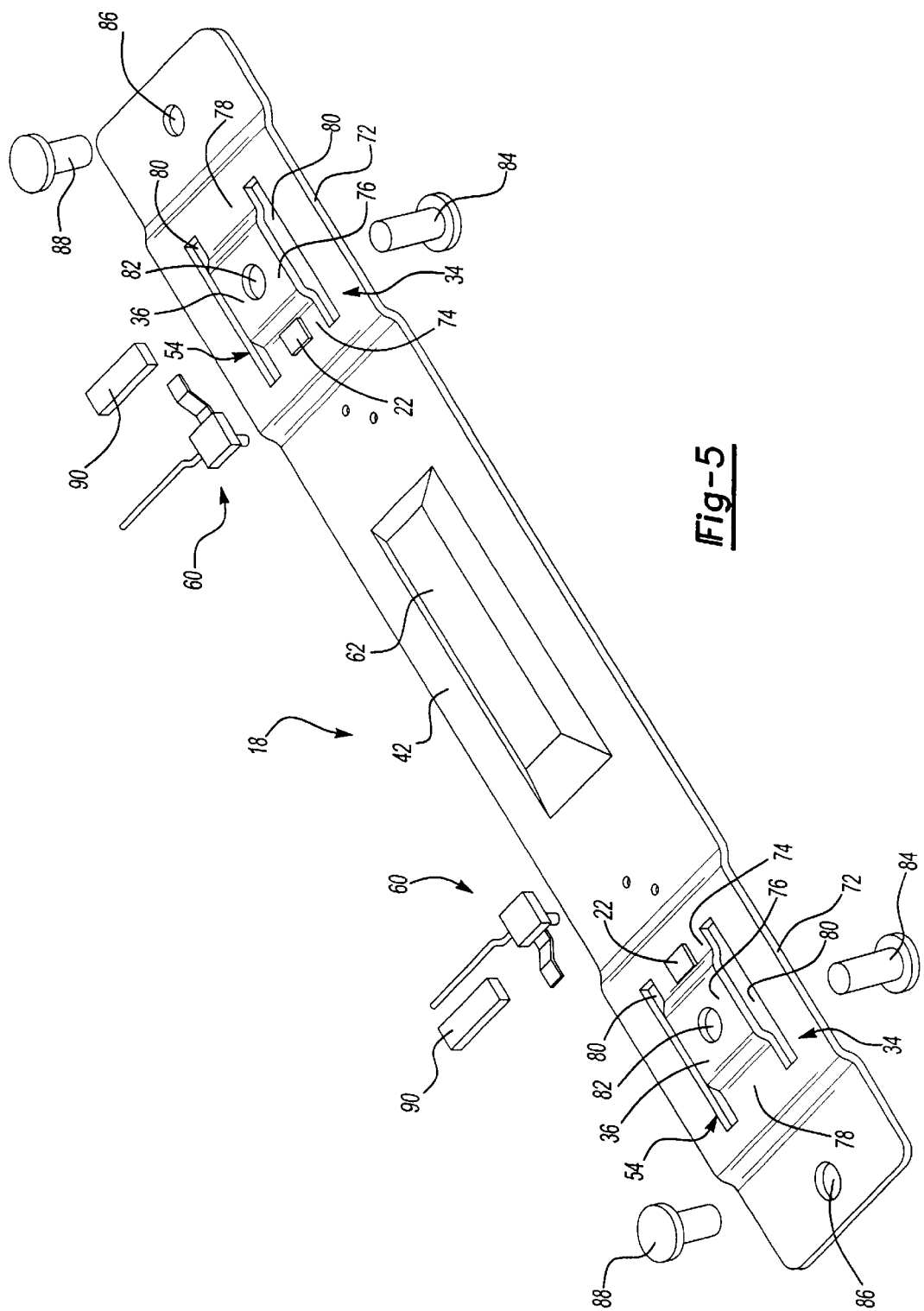
FIG. 5 is an exploded view of an alternate embodiment bracket assembly.

FIG. 5 shows the preferred embodiment for the deflectable portions 34. In this embodiment the brackets 18 include a seat attachment section 72 located a between the central body portion 42 and each of the mounting portions 28. The seat attachment sections 72 are in a plane that is vertically higher than the central body portion plane and the seat attachment sections 72 include the openings 54 that surround the deflectable portions 34. The mounting portions 28, seat attachment sections 72, deflectable portions 34, and central body portion 42 are all formed from a unitary member.

The deflectable portions 34 include a first section 74, a second section 76 that includes the mount interface 36, and a third section 78. The first 74 and third 78 sections extend into the seat attachment portion 72 and the middle or second section 76 includes the mount interface 36. The second section 76 is vertically higher than both the central body portion 42 and the seat attachment portions 72. The first 74 and third 78 sections are preferably on the same level as the raised seat attachment portion 72. The openings 54 are further defined as slots 80 positioned on either side of the deflectable portions. Thus, the deflectable portions 34 are attached at opposing ends to the seat attachment portions 72.

Figure 6:
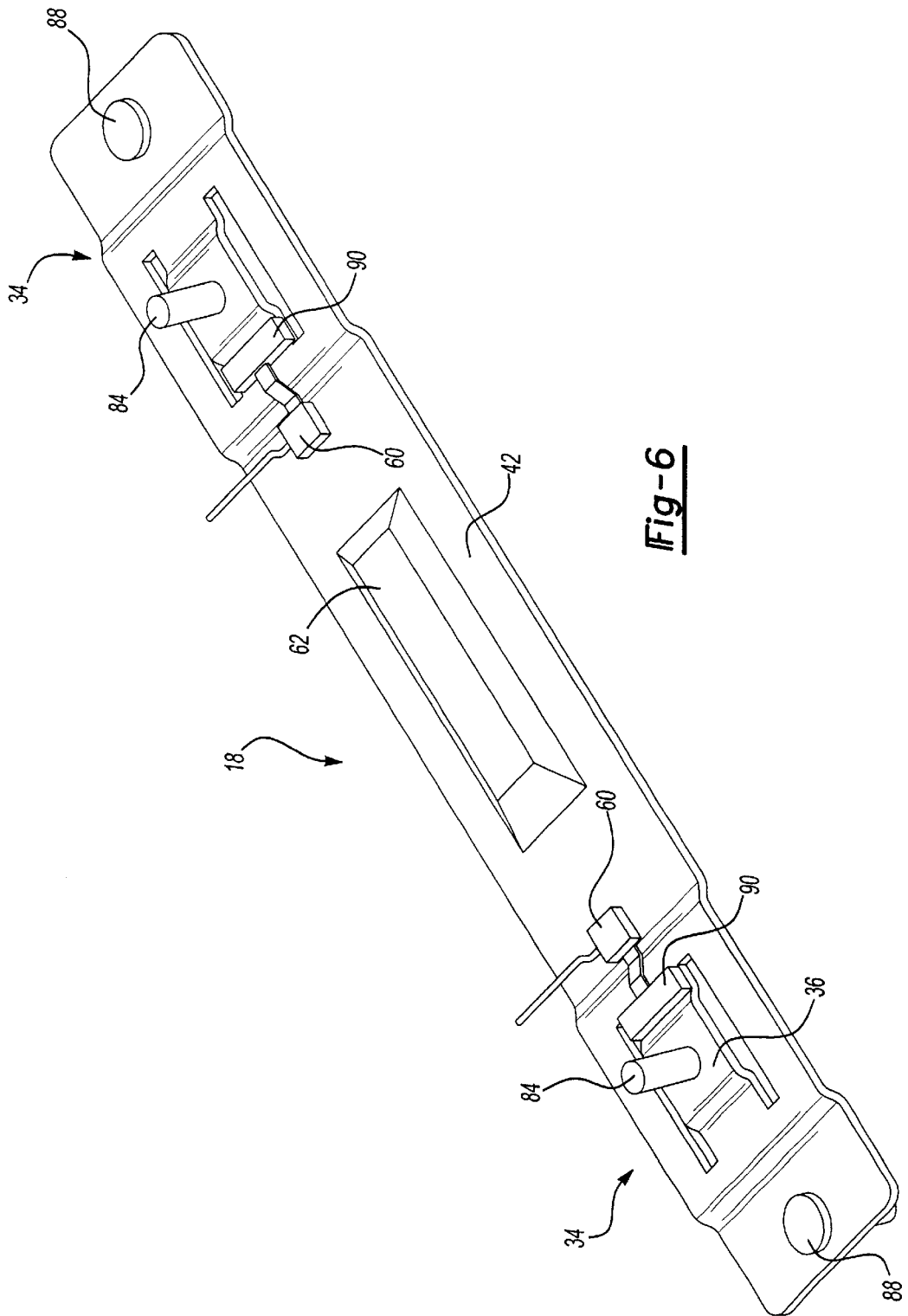
FIG. 6 is an assembled view of the embodiment shown in FIG. 5.

The sensor 22 is preferably mounted on the first section 74 and the mount interface 36 includes at least one aperture 82 for receiving at least one fastener 84 for attachment to the seat structure. Each of the mounting portions 28 includes at least one aperture 86 for receiving at least one fastener 88 to attach the brackets 18 to the vehicle structure. The weight force applied to the seat structure is transferred to the deflectable portions 34 via the mount interface 36. The sensors 22 measure the strain on the deflectable portions 34 and these measurements are then translated into a seat occupant weight measurement. In this embodiment, the ASIC 60 is mounted on the central body portion 42, shown in FIG. 6. A flexible seal member 90 is mounted on the deflectable portion 34 to protect the sensor 22. At least one strengthening rib 62 is preferably formed within the central body portion 42 to increase structural stability.

Figure 7:
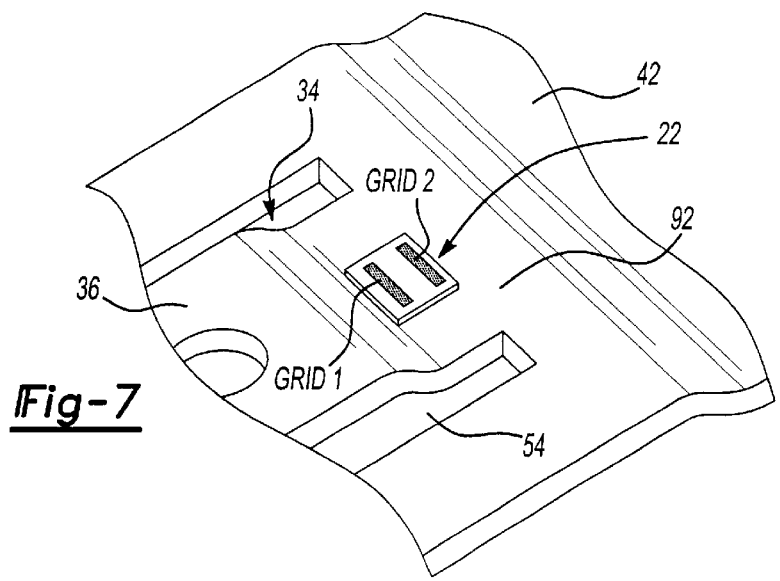
FIG. 7 is a perspective view, partially cut-away of a sensor mounting configuration.

The sensors 22 are preferably strain gages. In all of the above embodiments, the sensors 22 are preferably mounted as shown in FIG. 7. One end 92 of the deflectable portion 34 is fixed at the central body portion 42. The mounting interface 36 receives the input weight force W, which causes the deflectable portion 34 to experience strain. The sensor 22 measures this strain. The sensor 22 defines a pair of grids, GRID 1 and GRID 2.

Figure 8:
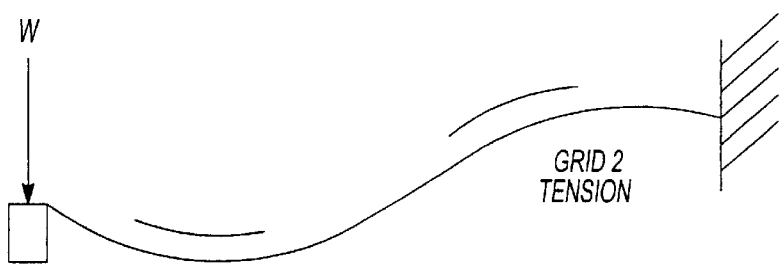
FIG. 8 is a schematic view of the bending exhibited by the subject invention.
Figure 9:
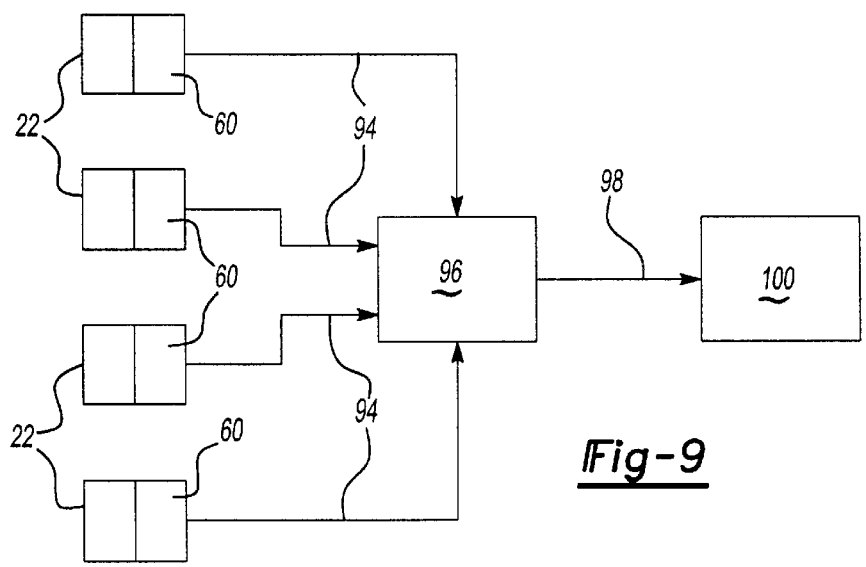
FIG. 9 is a schematic diagram of the control system for the subject invention.

Because the deflectable portion 34 is fixed at the central body portion 42, the deflectable portion 34 exhibits S-shaped bending as shown in FIG. 8. Due to the weight force W at the mount interface 36, GRID 1 is in compression and GRID 2 is in tension. Preferably the sensor 22 is configured for a region of 150 $\mu\epsilon$ at a 300 pound load.

As discussed above, the sensors 22 are preferably strain gages and can be full or half bridges. The electrical connections between the sensors 22, the integrated circuit 60, the ECU, and the safety system control can be of any known type of electrical connection in the art. The sensors 22 and ASIC 60 communicate a signal 94 from each sensor location to an electronic control unit (ECU) 96. The ECU 96 determines the seat occupant weight based on the sensor measurements and classifies the occupant (adult, child, etc.). A control signal 98 is then sent to control deployment of a safety system 100, such as an airbag, based on the classification.

It should be understood that any of the bracket embodiments discussed above could be used in any of the different mounting configurations. Further, additional and optional features such as the strengthening rib and the application specific integrated circuit can also be applied to any of the different bracket embodiments.

Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:

1. A sensor assembly for measuring seat occupant weight comprising:
   a central body portion;
   a first mounting portion at one end of said central body portion for attachment to a vehicle structure;
   a second mounting portion at an opposite end of said central body portion for attachment to the vehicle structure;
   at least one deflectable portion that is movable relative to said central body portion and includes a mount interface for attachment to a seat structure wherein said central body portion, said first and second mounting portions, and said deflectable portion are formed as a unitary member; and
   a sensor mounted on said deflectable portion to measure a seat occupant weight force applied to the seat structure.

2. An assembly according to claim 1 wherein said central body portion defines a first plane and said deflectable portion defines a second plane at said mount interface that is vertically higher relative to said first plane.

3. An assembly according to claim 2 wherein said first and second mounting portions are positioned within said first plane.

4. An assembly according to claim 1 including at least one strengthening rib formed within said central body portion.

5. An assembly according to claim 1 wherein said first mounting portion is located adjacent to a front end of the seat structure and said second mounting portion is located adjacent to a rear end of the seat structure.

6. An assembly according to claim 1 wherein said deflectable portion includes an upper level including said mount interface and a lower level defining a sensor mounting surface.

7. An assembly according to claim 6 wherein said sensor is comprised of at least one strain gage mounted on said sensor mounting surface.

8. An assembly according to claim 1 including an application specific integrated circuit mounted on said central body portion and operatively connected to said sensor for communication with an electronic control unit.

9. An assembly according to claim 8 including at least one integrally formed tab extending outwardly from said central body portion and including a pocket for receiving said application specific integrated circuit.

10. A sensor assembly for measuring seat occupant weight comprising:
    a first bracket member mountable between a seat structure and a vehicle structure at an inboard side of a vehicle seat;
    a second bracket member mountable between the seat structure and the vehicle structure at an outboard side of the vehicle seat wherein each of said first and second bracket members includes
    a central body portion;
    a first mounting portion for attachment to the vehicle structure adjacent to a front portion of the vehicle seat;
    a second mounting portion for attachment to the vehicle structure adjacent to a rear portion of the vehicle seat;
    a first deflectable portion positioned between said first mounting portion and said central body portion and including a first mount interface for attachment to the seat structure, said first deflectable portion being movable relative to said first mounting portion;
    a second deflectable portion positioned between said second mounting portion and said central body portion and including a second mount interface for attachment to the seat structure, said second deflectable portion being movable relative to said second mounting portion;

a first sensor mounted on said first deflectable portion to measure at least a portion of a seat occupant weight force applied to the seat structure; and a second sensor mounted on said second deflectable portion to measure at least a portion of said seat occupant weight force applied to the seat structure.

11. An assembly according to claim 10 wherein said vehicle structure is a floor and said seat structure is a track assembly.

12. An assembly according to claim 10 wherein said vehicle structure is a riser assembly and said seat structure is a track assembly.

13. An assembly according to claim 10 wherein said vehicle structure is a floor and said seat structure is a riser assembly.

14. An assembly according to claim 10 including a first seat attachment portion extending from said first mounting portion to said central body portion and a second seat attachment portion extending from said second mounting portion to said central body portion, said first seat attachment portion having a first base portion for supporting said first deflectable portion and said second seat attachment portion having a second base portion for supporting said second deflectable portion wherein said first and second mounting portions, said first and second seat attachment portions, said first and second deflectable portions, and said central body portion are all integrally formed as one piece.

15. An assembly according to claim 14 wherein said central body portion defines a first plane an said first and second base portions define a second plane that is vertically higher than said first plane.

16. An assembly according to claim 15 wherein said first and second mount interfaces define a third plane that is vertically higher than said second plane.

17. An assembly according to claim 16 wherein said first and second mounting portions are located within said first plane.

18. An assembly according to claim 14 wherein said first deflectable portion is attached at both ends to said first base portion and said second deflectable portion is attached at both ends to said second base portion.

19. An assembly according to claim 18 wherein said first mount interface is centrally positioned on said first deflectable portion and said second mount interface is centrally positioned on said second deflectable portion, said first and second mount interfaces each including at least one opening for receiving at least one fastener to secure said first and second deflectable portions to the seat structure.

20. An assembly according to claim 14 wherein said first deflectable portion has a first end attached to said first base portion and a second end attached to the seat structure via said first mount interface and said second deflectable portion has a first end attached to said second base portion and a second end attached to the seat structure via said second mount interface.

* * * * *